United States Patent [19]

Fukuyama et al.

[11] Patent Number: 4,463,873

[45] Date of Patent: Aug. 7, 1984

[54] ARTICLE TRANSFER APPARATUS

[75] Inventors: Katsuhiro Fukuyama, Miura; Masatoshi Haruta, Fukuoka; Takashi Takahashi, Yokohama, all of Japan

[73] Assignee: Tokyo Shibaura Denki Kabushiki Kaisha, Kawasaki, Japan

[21] Appl. No.: 357,084

[22] Filed: Mar. 11, 1982

[30] Foreign Application Priority Data

Mar. 18, 1981 [JP] Japan ................................ 56-39234

[51] Int. Cl.$^3$ ............................................ B65G 43/08

[52] U.S. Cl. .................................... 221/12; 198/444; 198/524

[58] Field of Search ............................ 445/66, 67, 69; 198/391, 444, 493, 524; 221/12, 13, 2, 9, 22, 298, 289, 301; 193/2 R

[56] References Cited

U.S. PATENT DOCUMENTS 1,944,313 1/1934 Brandt ................................ 193/2 R
2,270,909 1/1942 Spizer ................................ 193/2 R
2,571,840 10/1951 Curlee ................................ 193/2 R
2,764,800 10/1956 Harwood ................................ 445/67
3,260,404 7/1966 Critchell ................................ 221/22 X

*Primary Examiner*—Joseph J. Rolla
*Assistant Examiner*—C. Compton
*Attorney, Agent, or Firm*—Cushman, Darby & Cushman

[57] ABSTRACT

A number of identical articles, for example, coiled filaments for electric lamps are retained by a shutter member at a starting station. When the article is not present in a hopper station which is arranged at an intermittent feeding mechanism of an article assembling station and which temporarily retains the article, the shutter member is opened so as to feed the article from the starting station to the hopper station through two chutes which are slanted at different angles. The article is fed to the intermittent feeding mechanism of the article assembling mechanism from the hopper station at the operating timing of the intermittent feeding mechanism.

18 Claims, 11 Drawing Figures

ARTICLE TRANSFER APPARATUS

BACKGROUND OF THE INVENTION

The present invention relates to an article transfer apparatus for continuously receiving identical articles such as coiled filaments held in a feeding unit such as a vibrating bowl feeder and for transferring them to an article assembling station with a feeding mechanism.

The article assembling station comprises a filament mounting machine in an automatic manufacturing system of light bulbs for an electric lamp or a fluorescent lamp when the article is a coiled filament. With the intermittent operation of the article transfer apparatus, filaments are transferred to the filament mounting machine one by one.

A vibrating bowl feeder which randomly stores coiled filaments is disclosed in U.S. Pat. Nos. 3,106,181; 3,115,233; 3,200,965 and 3,207,287. Among these U.S. patents, in U.S. Pat. No. 3,207,287, a vibrating bowl feeder has a structure wherein each of filaments stored in the vibrating bowl feeder is fed from the feeder through a chute which is inclined downward along the transfer direction, and is transferred to a feeding mechanism of a mounting machine disposed therebelow in response to an intermittent operation of the feeding mechanism, that is, an index operation thereof. A plurality of shutter members which temporarily hold the descending filament are disposed at the chute. The shutter members selectively repeat opening/closing operation in accordance with the assembling operation so as to sequentially feed the filaments. Since the smooth surface of the chute is relatively long, a plurality of shutter members are preferably incorporated to control the position and orientation of the filament descending on the chute. However, the plurality of shutter members may result in the complicated structure of the apparatus and the sophisticated operation control therefor.

On the other hand, when shutter members are disposed only at the inlet port side of the chute and are free to open in response to the index operation of the feeding mechanism of the article assembling station, the following problem is presented. As described above, since the smooth surface of the chute must be relatively long, the descending time of the filament is prolonged. When dust is attached to the surface of the chute or the surface thereof is contaminated, the descending time of the filaments becomes irregular. This irregular descending time results in mismatch with the index timing of the feeding mechanism. When the above problem is considered, the high speed operation of the apparatus is hardly achieved.

In the conventional article transfer apparatus, since the opening/closing operation of the shutter members is generally synchronous with the timing of the index operation of the feeding mechanism of the article assembling station, the shutter member may close even if the operation for feeding the filament is not actually completed. If this occurs, the filament is clamped by the shutter. As a result, a trouble occurs in smooth filament feeding and the filament may fly away. This problem is attributable to the fact that the opening/closing operation of the shutter member is independent of the actual operation for feeding the filaments.

In the conventional article transfer apparatus, a typical example of which is U.S. Pat. No. 3,207,287, the filament descends along the smooth surface of the chute, as if the filament rolls down thereon, remaining transversely thereon, that is, with its longitudinal axis being perpendicular to the feeding direction.

In an article transfer apparatus of this type, if proper inclination of the smooth surface is established, the filament rolls down thereon by its weight. Thus, this arrangement has an advantage in that special vibrating feeder means is not required. However, the position and orientation of the filament which is rolling down on the smooth surface are unstable. Therefore, a plurality of shutter members must be disposed at equal intervals on the smooth surface of the chute. Further, the filament descending time is hardly shortened.

SUMMARY OF THE INVENTION

The present invention has been made to eliminate the above problems of the conventional article transfer apparatuses and has for its object to provide an article transfer apparatus wherein an operating time of a feeding mechanism of an article assembling station constantly and properly correspond to a timing for feeding an article, the operation for feeding the article is highly reliable, the overall operation is performed at high speed, and a control system for feeding the article and the overall structure are simplified.

In order to achieve the above object of the present invention, there is provided an article transfer apparatus substantially comprising: a rockable shutter member at a delivery end of a starting station which receives each article fed from a feeding unit which contains articles; hopper means, adjacent to a feeding mechanism of an article assembling station, for temporarily retaining the article; chute means located between the hopper means and the starting station; and detecting means, disposed in the hopper means, for detecting whether or not the article is present in the hopper means, wherein, when the detecting means detects the absence of the article in the hopper means, a detection signal is generated so as to open the shutter member and the article is slid on the chute means and transferred to the hopper means. The article is transferred from the hopper means to the feeding mechanism of the article assembling station in synchronism with an operating timing of the feeding mechanism, that is, the index operation thereof.

In the article transfer apparatus of the present invention, since the hopper means is disposed adjacent to the feeding mechanism and each article is constantly and properly supplied from the starting station to the hopper means through the chute means, in advance, the descending time of the article which is slid on the relatively long smooth surface of the chute means does not adversely affect the timing for feeding the article. Further, only a single shutter member is disposed at the starting station, that is, the starting end of the chute means, thus simplifying the control system.

In the article transfer apparatus of the present invention, the longitudinal axis of the article such as a coiled filament is parallel to the feeding direction. The article is thus not fed transversely but longitudinally, so that means for guiding the article comprises a channel or a trough member having a U-shaped cross section. The articles are rapidly guided therethrough. The transfer time of the article in the channel is shortened and the position and orientation of the article are easily controlled.

The above and other features and effects obtainable therewith together with the basic construction will become apparent from the description of the preferred embodiments of the present invention when taken in conjunction with the accompanying drawings.

DETAILED DESCRIPTION OF THE PREFERRED EMBODIMENT

Figure 1:
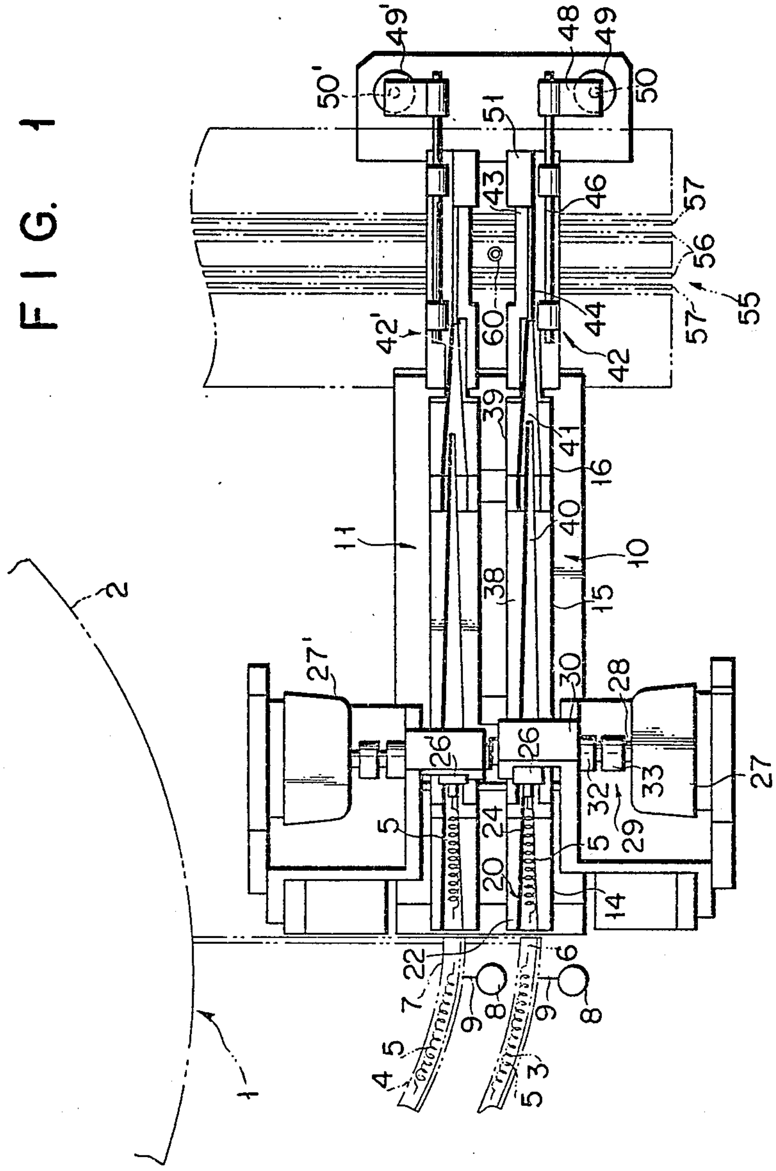
FIG. 1 is a plan view of an article transfer apparatus according to the present invention.

An article used in an article transfer apparatus of the present invention comprises identical coiled lamp filaments. A feeder main body 2 of a vibrating feeder 1 stores a number of filaments 5 randomly. A main transfer path 3 and an auxiliary transfer path 4 which are not illustrated in detail extend from the feeder main body 2 in a spiral shape. The vibrating feeder 1 is of a known structure. Delivery ends of the main and auxiliary transfer paths 3 and 4 are horizontally spaced apart from each other. Air supply pipes 9 are respectively disposed at the delivery ends in order to blow the filament. Air pumps 8 are respectively connected to the air supply pipes 9.

A main transfer unit 10 and an auxiliary unit 11 are spaced apart to be parallel to each other and disposed at corresponding delivery ends. Since the auxiliary transfer unit 11 is disposed to transfer the filaments when the main transfer unit 10 is unable to transfer them, the auxiliary transfer unit is not the essential unit in the article transfer apparatus. The components in the auxiliary transfer unit 11 are indicated by corresponding numbers of the unit 10 with primes.

The main transfer unit 10 is disposed on a vibrating mechanism 12 which is, in turn, disposed on a stationary base 13. As is apparent from FIG. 2, the main transfer unit 10 is inclined or slanted downward along the feeding direction of the filament 5. Linearly reciprocal vibration is generated by the vibrating mechanism 12 and transmitted to the main transfer unit 10 along the feeding direction. A known vibrating mechanism may be used for this purpose. The auxiliary transfer unit 11 is also disposed on the same vibrating mechanism 12. Since the main and auxiliary transfer units 10 and 11 have the same structure, a description will be made only for the main transfer unit 10.

The main transfer unit 10 has a first portion 14 which constitutes the starting station, and second and third portions 15 and 16 which constitute the chute section. The first to third portions 14 to 16 are of the staircase chute structure. The inclined angles of the first and second portions 14 and 15 are substantially the same with respect to the horizontal plane. The inclined angle of the third portion 16 is smaller than that of the first and second portions 14 and 15. The first to third portions 14 to 16 comprise an elongate block member which has U-shaped guide grooves 17, 18 and 19.

Figure 4:
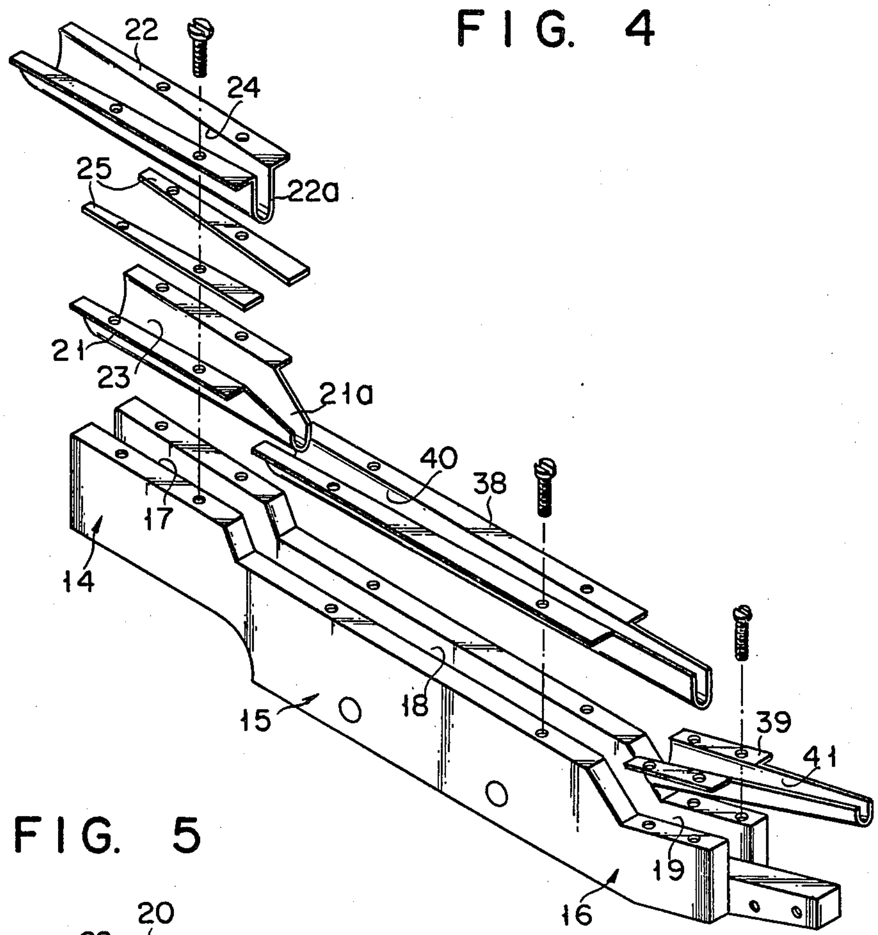
FIG. 4 is an exploded perspective view of a starting station, a hopper station and a chute.
Figure 5:
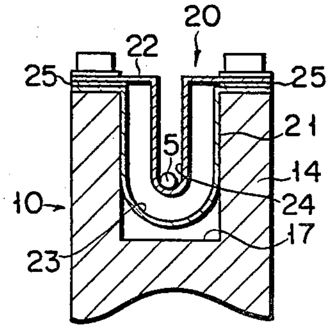
FIG. 5 is an enlarged cross-sectional view of the starting station along the line V—V of FIG. 2.

The first portion (to be referred to as a starting station hereinafter) has a size enough to retain each filament 5 which is longitudinally fed out from the main transfer path 3. The filament 5 is fed so that the longitudinal axis thereof is parallel to the feeding direction. A pair of U-shaped channel members 21 and 22 which constitute a hopper chute assembly 20 are mounted to a flanged portion of the guide groove 17 of the block member of the starting station 14. The channel members 21 and 22 are made of an electrically conductive thin metal plate. The channel members 21 and 22 constitute contacts for detecting the presence of the filament 5 to be described later. As is apparent from FIG. 5, the flanged portion of the channel member 22 having a channel 24 smaller than a channel 23 of the channel member 21 is placed on the flanged portion of the channel member 21 through an electrically insulating material 25. The channel members 21 and 22 are fixed with proper means such as a bolt. The smaller channel 24 constitutes a channel for transferring the filament 5. As apparent from the exploded view of FIG. 4, the channels 23 and 24 of the channel members 21 and 22 are gradually tapered from the inlet ports toward the delivery ends, respectively. These channel members are manufactured by drawing. Therefore, before the filament 5 reaches a predetermined retaining position inside the channel 24 of the starting station 14, vibration is damped. Thus, the filament is properly positioned and is rapidly transferred to the predetermined position.

Figure 6:
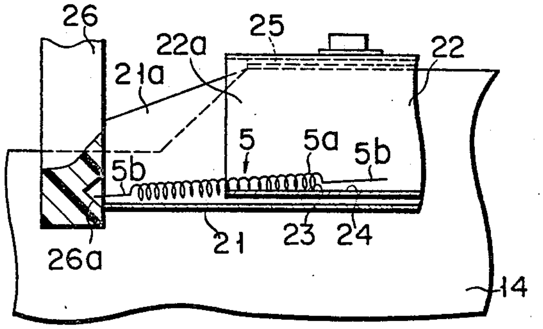
FIG. 6 is an enlarged, partial cutaway view of the starting station and the shutter member.

As shown in FIG. 6, a delivery end portion 21*a* of the lower channel member 21 extends longer than a delivery end portion 22*a* of the upper channel member 22 and further extends into the guide groove 18 of the second portion 15. The lower channel member 21 is grounded and the upper channel member 22 is connected to a power source (not shown). Thus, detecting means for detecting the presence of the filament is constituted.

When the filament fed from the main transfer path 3 reaches the position shown in FIG. 6, the filament 5 comes in contact with the channel members 21 and 22. Thus, the channel members 21 and 22 are rendered conductive and the position of the filament 5 is detected. A detection signal is transmitted to the pumps 8 through a proper detecting circuit (not shown) so as to operate the pumps to blow air from the air supply pipes 9. Therefore, the starting station 14 only receives one filament 5 at a time. In response to the detecting signal from the detecting means the air pump 8 blows away the other articles, thus returning them to the feeder 1. That is, the air pump 8 operates only when it is unnecessary to feed the articles into the starting station 14.

Figure 2:
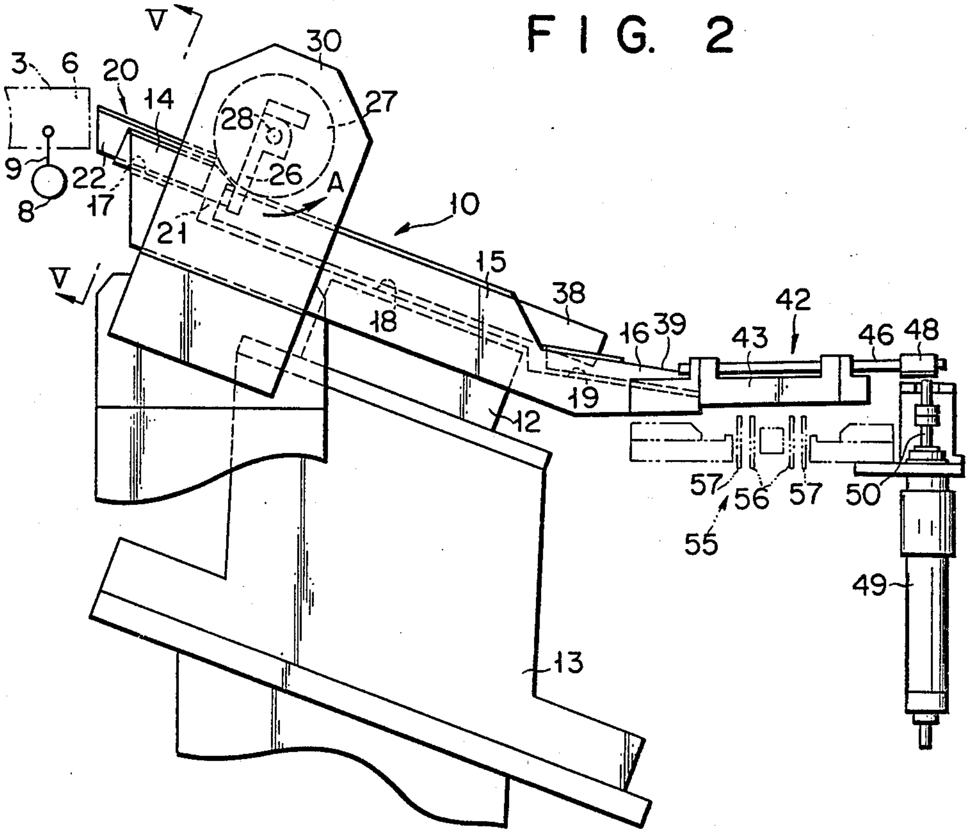
FIG. 2 is a side view of the article transfer apparatus of FIG. 1.
Figure 3:
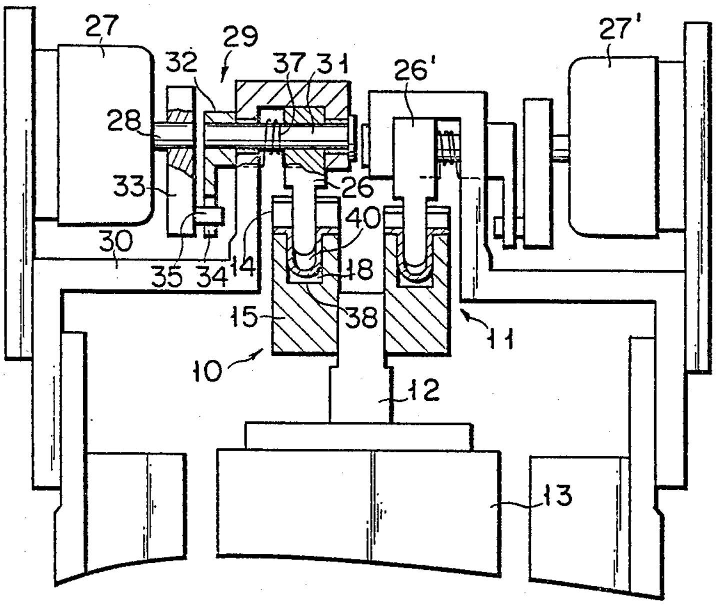
FIG. 3 is a partially cutaway, front view of a shutter member of the article transfer apparatus of FIG. 1.

A shutter member 26 of a plate material which allows opening/closing of the delivery end of the starting station 14 is rockably mounted so as to oppose the delivery end thereof. The lower portion of the shutter member 26 extends into the guide groove 18. The shutter member 26 is rockable in the counterclockwise direction indicated by arrow A of FIG. 2 from the closing position to the opening position by a rotary solenoid 27. In particular, the shutter member 26 is connected to an armature shaft 28 of the rotary solenoid 27 through a power transmitting mechanism 29. Further, as shown in FIG. 3, a shutter shaft 31 on which is fixed the shutter member 26 is coaxial with the armature shaft 28 and supported on a common bracket 30. An engaging pin 35 mounted to a lever 33 which is fixed to the armature shaft 3]engages with a notch 34 formed in a lever 32 which is fixed to the shutter shaft 28. Thus, the power transmitting mechanism 29 is constituted. Reference numeral 37 denotes a return spring which urges the shutter member 26 to the closing position.

First and second chute members 38 and 39 are respectively fitted in the guide grooves 18 and 19 of the second and third portions 15 and 16 which both constitute the chute means. The flanged portions of the chute members 38 and 39 are fixed by proper means such as bolts, respectively. The chute members 38 and 39 are each made of a U-shaped thin metal plate in the same manner as the pair of channel members 21 and 22. The channel members 38 and 39 respectively have channels 40 and 41 which respectively transfer the filaments. As is apparent from FIG. 4, the channels 40 and 41 of the first and second channel members are tapered along the feeding direction of the filament. The tapered channels 40 and 41 maintain the rapid feeding rate of the filament 5 and damp the transverse vibration.

A relatively large step is formed between the trailing end of the first chute member 38 and the leading end of the second chute member 39. The inclined angle of the channel 40 of the first chute member 38 with respect to the horizontal axis is larger than that of the channel 41 of the second chute member 39. Therefore, when the filament descends from the first chute member 38 to the second chute member 39, the filament 5 drops in the diving state on the surface of the channel 41 of the second chute member 39 while being kept parallel to the inclined surface of the channel 40. The leading end of the filament will not drop first on the surface of the channel 41. Therefore, bending and damage of the filament is prevented and the smooth operation for feeding the filament is guaranteed. The first chute member 38 has a length which is about twice the length of the second chute member 39.

The shutter member 26 will be further described in detail with reference to FIG. 6. A recess 26*a* of the conical shape is defined by a slanted guiding surface formed on the surface of the left side of the shutter member 26 in FIG. 6, that is, the surface of the shutter member 26 at the side of the starting station 14. A front stem 5*b* among stems of the coil 5*a* of the filament which is fed to the starting station engages the slanted guiding surface of the recess 26*a*. Since this recess is formed, irregular movement of the filament 5 is prevented even if the filament 5 is soft. Thus, the filament 5 will not move upward or downward along the surface of the shutter member 26. The recess 26*a* may be of any shape instead of the conical shape.

A feeding hopper station 42 which constitutes hopper means for temporarily retaining the filament 5 is connected to the delivery end portion of the third portion 16. As shown in FIGS. 7 to 10, the feeding hopper station 42 has a hopper main body 43 which defines a channel 44 which is open upward and of a narrow width. The bottom portion of the channel 44 is normally closed by a projection 45*a* of a shutter block 45 which is swingable or rockable. The shutter block 45 constitutes a pair of block members together with the hopper main body 43, as shown in FIG. 9. An end face of the projection 45*a* is in contact with the wall surface of the main body 43 and prevents dropping of the filament 5 from the channel 44.

The shutter block 45 is fixed to a shaft which is supported by the hopper main body 43 and usually maintained in the closing position of FIG. 9 by the urging force of a torsion spring 47. As shown in FIGS. 1 and 2, a rotary plate 48 is fixed at one end of the shaft 46. An upper end of a piston rod 50 of a vertically disposed operating cylinder 49 is disposed immediately below the rotary plate 48. When the piston rod 50 is lifted in response to the operation of the operating cylinder 49, the rotary plate 48 is pushed upward and the shaft 46 rocks in the direction indicated by arrow B of FIGS. 7, 9 and 10 against the torsion spring 47. The shutter block 45 rocks integrally with the shaft 46 in the opening position in the clockwise direction, indicated by the broken line of FIG. 9. Thus, the filament 5 is allowed to drop from the channel 44.

A stop member 51 is slidably mounted to the hopper main body 43. The sliding range is defined by an elongate groove 51*a* and a bolt 52. As indicated by the broken line of FIG. 8, the stop member 51 has an inclined guiding surface 51*b*. The filament 5 stops when the stems 5*b* thereof comes in contact with the surface 51*b*. The position of the guiding surface 51*b* may be changed by sliding the stop member 51 and is adjusted in accordance with the length of the filament.

Figure 10:
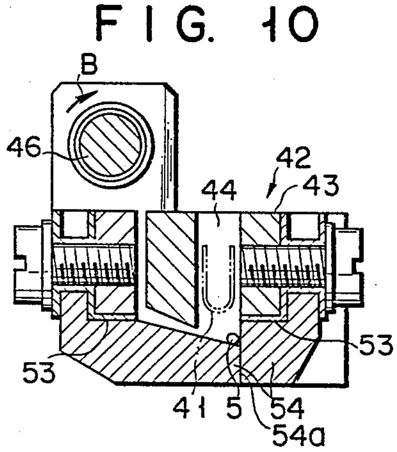
FIG. 10 is an enlarged sectional view along the line X—X of FIG. 7.

Means for detecting the presence or absence of the filament 5 is disposed in the feeding hopper station 42. The hopper main body 43 and the shutter block 45 are partially removed and a pair of conductive detecting pieces 54 are fitted therein through an electrically insulating material 53. The pair of detecting pieces 54 are fixed in the hopper main body 43 by means such as bolts. The pair of detecting pieces 54 are connected to a detecting circuit (not shown). On the other hand, the hopper main body 43 is grounded. Therefore, the pair of detecting pieces 54 constitute part of the channel 44, as shown in FIG. 10.

When the shutter block 45 is located in the closing position, the facing surfaces 54*a* of the detecting pieces 54 come into mutual contact. Nonetheless, the detecting pieces 54 are completely insulated from other parts by the material 53. The surface 54*a* of one of the detecting piece 54 is flush with the surface of the member 43 which defines the channel 44. Similarly, the surface 54*a* of the other detecting piece 54 is flush with the surface of the shutter block 45.

Figure 7:
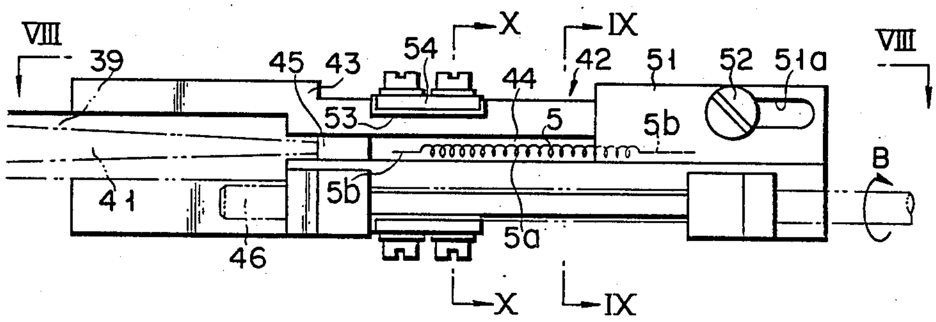
FIG. 7 is a plan view of the hopper station.
Figure 8:
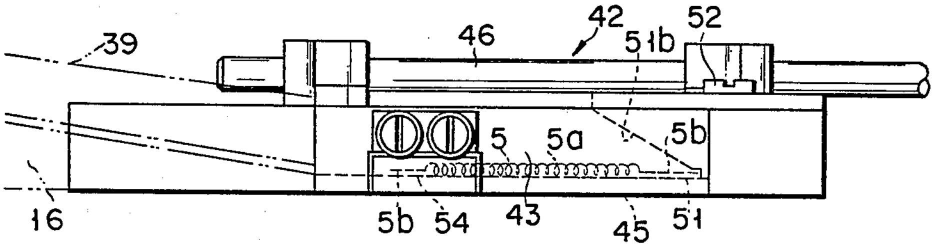
FIG. 8 is a sectional view along the line VIII—VIII of FIG. 7.
Figure 9:
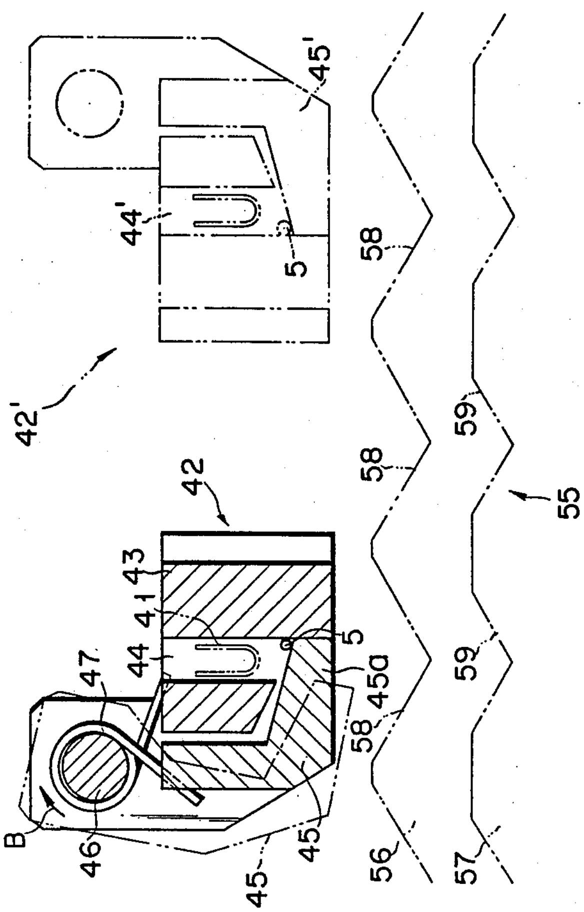
FIG. 9 is an enlarged sectional view along the line IX—IX of FIG. 9, schematically illustrating an auxiliary transfer unit and a feeding mechanism of the article mounting machine with broken lines.

However, as shown in FIGS. 7 and 8, when the filament 5 comes in contact with the pair of the detecting pieces 54 within the channel 44, the hopper main body 43 is electrically connected to the pair of detecting pieces 54 through the filament 5. Thus, the detection signal which indicates the presence or absence of the filament 5 is generated by the detecting circuit.

The detecting circuit is electrically connected to the rotary solenoid 27 and the operating cylinder 49 which drives the shutter block 45. When the operating cylinder 49 starts operating in response to the detection signal which indicates the presence of the filament 5 and the shutter block 45 is opened, the filament 5 is fed out to an intermittent feeding mechanism of a filament mounting machine to be described later. When the filament within the hopper station is fed out, that is, when the hopper station becomes empty, the detection signal which indicates the absence of the filament inside the hopper station is supplied to the rotary solenoid 27. Thus, the rotary solenoid is excited and the shutter member 26 is opened.

The hopper station 42 is disposed adjacent to and immediately above a rack feeder 55 as the feeding mechanism of the filament mounting machine. As shown in FIGS. 1 and 2, the rack feeder 55 has movable racks 57 at both ends of stationary racks 56. A number of sawtooth shaped recesses 58 and 59 are formed at equal intervals on the upper surfaces of the racks, as shown in FIG. 9. By the cooperation of the racks 56 and 57, the filament 5 dropped thereon is transferred to the filament mounting machine. By the cooperation of the racks 56 and 57, the filament is intermittently transferred at a constant pitch under the control of the predetermined index operation. The rack feeder 55 is also used for the hopper station 42' of the auxiliary transfer unit 11. The mechanism of the rack feeder 55 is not substantially specified according to the present invention. A conventional mechanism may be utilized for this purpose which is indicated by the broken line in the figure.

Referring to FIG. 1, reference numeral 60 denotes a filament sensor which is disposed between the hopper station 42 of the main transfer unit 10 and the hopper station 42' of the auxiliary transfer station 11 at substantially the same height as the rack feeder 55. The filament sensor 60 is located one index ahead of the hopper station 42 along the feeding direction of the rack feeder 55. The filament sensor 60 is electrically connected to an operating cylinder 49' of the auxiliary transfer unit 11. When the filament is not transferred from the hopper station 42 of the main transfer unit 10 to the rack feeder 55, the filament sensor 60 immediately detects the absence of the filament on the rack feeder 55. Then, the filament sensor 60 supplies the detection signal which indicates the absence of the filament to the operating cylinder 49' of the auxiliary unit 11 so as to operate the operating cylinder 49'. Thus, the hopper station 42' is opened and the filament 5 stored therein, in advance, is supplied to the rack feeder 55. If a trouble occurs and the filament 5 cannot be transferred from the main transfer unit 10, the filament is immediately transferred from the auxiliary transfer unit 11 to the rack feeder 55 and the filaments are intermittently supplied to the filament mounting machine.

As described above, according to this filament transfer apparatus, when the filament is being transferred, a filament is constantly placed in the wait state in the leading end and the trailing end of the transfer path, that is, in the starting station and the hopper station. If the filament is not present in the hopper station, it is fed from the starting station. Since the hopper station is located immediately next to the rack feeder 55, time for feeding the filament to the rack feeder 55 is short and the filament is properly fed. The feeding efficiency is greatly improved. Therefore, the feeding operation by the rack feeder 55 and the mounting operation by the filament mounting machine can be performed at high speed and the overall efficiency in the automatic product lines of the filament lamp is greatly improved.

Figure 11:
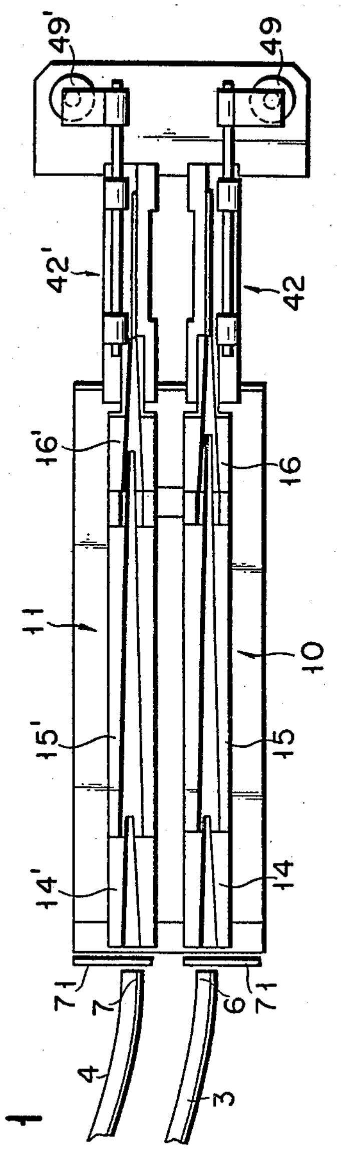
FIG. 11 is a plan view of a modification of an article transfer apparatus according to the present invention, corresponding to the view of FIG. 1.

In the first embodiment, a case is disclosed wherein the shutter member 26 is located between the first portion 14 which constitutes the starting station and the second portion 15 which partially constitutes the chute means. FIG. 11 shows a modification of the above embodiment. Shutter members 71 are respectively located between the inlet port ends of the first portions 14 and 14' and the delivery ends 6 and 7 of the main and auxiliary transfer paths 3 and 4. With this modification, the filaments are temporarily retained at the delivery ends 6 and 7 of the main and auxiliary transfer paths 3 and 4 by the shutter members 71. In this case, the delivery ends 6 and 7 correspond to the starting station of the first embodiment. The first to third portions 14, 15 and 16 correspond to the chute means of the first embodiment.

The present invention is not limited to a case wherein the hopper main body 43 is constituted as part of detecting contacts as the filament detecting mechanism in the hopper station 42. A separate contact mechanism may be disposed within the hopper station.

Only the main transfer unit 10 satisfies the purpose of the present invention. The auxiliary transfer unit may be used under an abnormal condition i.e., the filament is not transferred from the main transfer unit 10. Therefore the present invention is not limited to an apparatus with the main and auxiliary transfer units 10 and 11.

The article to be used in the article transfer apparatus of the present invention is not limited to the coiled lamp filaments. Other identical small articles such as coil springs and screws may also be transferred with the article transfer apparatus of the present invention.

What we claim is:

1. An article transfer apparatus for continuously sequentially receiving a number of identical articles held in a feeding unit and for transferring each of the articles to an article assembling station with a feeding mechanism, comprising:

a starting station having a receiving end and a delivery end, which is connected to said feeding unit at said receiving end thereof, and sequentially receiving the articles from said feeding unit;

shutter means operative to selectively open said delivery end of said starting station, upon which the article is fed from said delivery end of said starting station, the shutter means having a plate member which is rockably mounted about an axis, said plate member being located substantially vertically in a closing position to close said delivery end, and said plate member rocking along the feeding direction of the article to be separated from said delivery end when said plate member moves to an opening position;

chute means connected to said delivery end of said starting station and slanted so that the article fed from said starting station upon the opening operation of said shutter means rolls down therealong;

hopper means adapted to open and close freely and located close to said feeding mechanism of said article assembling station so as to receive the article rolled down by said chute means and to temporarily retain the article, the article within said hopper means being transferred to said feeding mechanism of said article assembling station when said hopper means is opened;

hopper actuating means for opening or closing said hopper means;

detecting means for detecting a presence or absence of the article in said hopper means and for generating a detection signal corresponding thereto; and means for opening said shutter means in response to the detection signal representing the absence of the article.

2. An apparatus according to claim 1, wherein the article is a coiled lamp filament, a longitudinal direction thereof being aligned with a feeding direction of the article.

3. An apparatus according to claim 1, further comprising second detecting means for detecting the presence or absence of the article at said starting station.

4. An apparatus according to claim 1, wherein a recess engageable with the article is formed in a surface of said plate member of said shutter means which opposes said delivery end of said starting station, so that the article is correctly positioned within said starting station.

5. An apparatus according to claim 1, wherein said starting station comprises a block member which has a groove extending in a feeding direction of the article, and a pair of thin channel members which are fitted in said groove member of said block member and which have substantially U-shaped cross sections opening upward, said pair of channel members being fixed on said block member as electrically insulated from each other.

6. An apparatus according to claim 5, wherein an upper channel member and a lower channel member of said pair of channel members extend such that said lower channel member extends toward said shutter means longer than said upper channel member, and said upper and lower channel members are rendered electrically conductive through the article when the article at said starting station is located at said delivery end thereof.

7. An apparatus according to claim 6, wherein a width of a groove defined by the substantially U-shaped cross section of said upper channel member is gradually tapered along the feeding direction of the article.

8. An apparatus according to claim 1, wherein said chute means includes first and second chute members which are sequentially arranged along the feeding direction of the article, said second chute member being downwardly slanted with respect to a horizontal axis at an angle smaller than an angle of said first chute member with respect to the horizontal axis.

9. An apparatus according to claim 8, wherein said first chute member has a length which is about twice a length of said second chute member.

10. An apparatus according to claim 8, wherein both said first and second chute members comprise thin channel materials having substantially U-shaped cross sections, widths of grooves defined by said cross sections being gradually tapered along the feeding direction of the article.

11. An apparatus according to claim 1, wherein said hopper means includes a pair of elongate block members which define an article retaining channel therebetween extending along the feeding direction of the article, one of said pair of block members being rockable about an axis extending in the feeding direction of the article, whereby allowing opening of said hopper means to drop the article retained in said article retaining channel onto said feeding mechanism of said article assembling station.

12. An apparatus according to claim 1, wherein said hopper means includes a stop member for stopping the movement of the article to a predetermined position within said hopper means.

13. An apparatus according to claim 11, wherein said detecting means includes at least one detecting piece embedded in one of said block members and electrically insulated therefrom, said detecting member having a surface which define a part of said article retaining channel.

14. An apparatus according to claim 1, wherein said feeding mechanism is a mechanism for intermittently feeding the articles.

15. An apparatus according to claim 2, further comprising means provided in said feeding unit for preventing other articles from entering the receiving end of said starting station when said second detecting means detects that the article is present in said starting station.

16. An apparatus according to claim 4, wherein said recess has an inclined surface for guiding the end of the article.

17. An apparatus according to claim 12, wherein said stop member has an inclined surface for guiding the end of the article.

18. An apparatus according to claim 13, wherein the surface of said detecting piece is flush with the surface of said block member which defines the article retaining channel, and said detecting means generates a detecting signal when the article is fed into the channel, thus electrically connecting said detecting piece to the block member through the article.

* * * * *